US009479703B2

(12) United States Patent
Yu (10) Patent No.: US 9,479,703 B2
(45) Date of Patent: Oct. 25, 2016

(54) AUTOMATIC OBJECT VIEWING METHODS AND APPARATUS

(71) Applicant: Hai Yu, Canton, MI (US)

(72) Inventor: Hai Yu, Canton, MI (US)

(73) Assignee: Hai Yu, Woodbury, MN (US)

( * ) Notice: Subject to any disclaimer, the term of this patent is extended or adjusted under 35 U.S.C. 154(b) by 255 days.

(21) Appl. No.: 14/499,225

(22) Filed: Sep. 28, 2014

(65) Prior Publication Data

US 2016/0094790 A1    Mar. 31, 2016

(51) Int. Cl.

| | |
|---|---|
| *H04N 5/77* | (2006.01) |
| *H04N 5/225* | (2006.01) |
| *H04N 5/232* | (2006.01) |
| *G01S 3/786* | (2006.01) |
| *H04N 21/2187* | (2011.01) |
| *H04N 21/472* | (2011.01) |
| *H04N 21/6587* | (2011.01) |
| *G06T 7/20* | (2006.01) |

(52) U.S. Cl.
CPC ......... *H04N 5/23296* (2013.01); *G01S 3/7864* (2013.01); *G06T 7/20* (2013.01); *H04N 5/23206* (2013.01); *H04N 5/23216* (2013.01); *H04N 5/23293* (2013.01); *H04N 21/2187* (2013.01); *H04N 21/47202* (2013.01); *H04N 21/6587* (2013.01); *G06T 2207/30232* (2013.01)

(58) Field of Classification Search
CPC ..................... H04N 5/23296; H04N 5/20206; H04N 5/23216; H04N 5/23293; H04N 21/2187; H04N 21/47202; H04N 21/6587; G06T 2207/30232; G06T 7/20; G01S 3/7864
USPC ........ 348/169, 175, 180, 187, 162; 386/207, 386/210, 223, 224, 227, 230
See application file for complete search history.

(56) References Cited

U.S. PATENT DOCUMENTS

2007/0120996 A1*  5/2007  Boillot ................... G06F 3/017
                                                        348/345

* cited by examiner

*Primary Examiner* — Robert Chevalier
(74) *Attorney, Agent, or Firm* — Hai Yu (57) ABSTRACT

The apparatus and methods for providing automatic and focused camera view over objects in motion. Camera view stream from a camera system is displayed on a user's mobile device. The invented system recognizes and highlights candidate objects in the camera view. After a user selects one or multiple candidate objects as the target object for view following, the system continuously computes the position and motion of the target object and it controls the camera orientation motion such that the aimpoint of the camera system follows the target object closely and at substantially the same velocity. The system also controls the camera zoom to achieve a reference object presentation ratio during view following. Meanwhile, the camera view stream is transferred to connected mobile devices and display devices. The camera view stream can also be recorded in video file for playback review and for video sharing through internet.

20 Claims, 9 Drawing Sheets

AUTOMATIC OBJECT VIEWING METHODS AND APPARATUS

TECHNICAL FIELD

The present invention is in the field of automatic camera view controls, pertains more particularly to apparatus and methods for providing quality focused camera view over moving objects in sport, performance and presentation activities. The invented automatic camera viewing system aims at supporting performance recording and assessment for high quality self-training, remote-training, and video sharing purposes.

BACKGROUND

In sports and performances, it is highly desirable to have a way to help people reviewing their performance with sufficiently focused details in order to improve their skills during training exercises and exhibitions. Camera systems are more and more intensively involved in such training and exhibition systems. The cameras produce video records that can be displayed to users. Both trainees and their coaches can review the recorded performance and exhibition in real time or afterwards to find out the insufficiency in the trainee's skill and performance. However, traditional camera recording processes usually need a professional person to manually operate the orientation and zoom of the camera in order to have a performer presented in the camera view with sufficient focuses on motion details. Such assistant services are hardly available or affordable for common exerciser and nonprofessional players in a regular basis.

Professional coaches can only provide training in a limited region and time schedule. People live in a farther region are expecting to have a way to get their specialized coaching remotely. The availability of a public accessible camera viewing and reviewing service will be able to help them realize their self-training and remote-training dreams in a most effective and cost-efficient way. Their performances can be recorded with sufficient details and they can be reviewed by their favorite coaches without requiring them onsite at the same training schedule.

In order to provide the desired services, this invention discloses camera system control methods and apparatus that can provide highly smooth and focused camera view controls to track user specified objects automatically. Such a high quality service has not been available in common public sport or activity places. Existing auto-focusing camera systems are incapable to follow the dynamic motions of a performer continuously and smoothly while capturing sufficient details of the performance.

The invented automatic camera viewing system integrates camera systems, mobile computerized devices, communication networks, and control systems. It is able to provide automatic object viewing applications including: fast initial target object locating; target object specification from mobile devices; automatic and focused object following and viewing controls; video recording and sharing; etc. The invented automatic camera viewing system provides services at public activity places. Users can access the service from their mobile device, like smartphones, and select desired target object to follow in camera view. Users can view and review recorded performance on their mobile devices or from any network connected computer and display devices, like desktop/laptop computer, tablet computer, smartphone, stadium large screen, etc.

The invented camera viewing system aims at supporting performance recording and assessment in activities like sports, performances and exhibitions. It provides a high quality auto-focus and auto-following camera viewing solution to satisfy training, performance assessment and entertainment needs in activities.

SUMMARY OF THE INVENTION

The following summary provides an overview of various aspects of exemplary implementations of the invention. This summary is not intended to provide an exhaustive description of all of the important aspects of the invention, or to define the scope of the inventions. Rather, this summary is intended to serve as an introduction to the following description of illustrative embodiments.

Illustrative embodiments of the present invention are directed to a method, an apparatus, and a computer readable medium encoded with instructions for automatically controlling camera based performance viewing and video recording systems.

In a preferred embodiment of this invention, video frames are captured from a camera system whose orientation motion is controlled to track the position and motion of a target object. The resulted motion of the camera aimpoint closely follows the target object in substantially the same velocity as the target object. The moving target object is thus captured in camera view smoothly and continuously. Furthermore, the camera zoom is controlled to achieve a reference object presentation ratio between the image size of the target object and the size of the camera view frame presented to users.

The invention disclosed and claimed herein comprises specifying a target object from a user's mobile device. First, the camera view is presented to a user on a mobile device through a WiFi network. The initial camera view is controlled to cover an area that contains a potential target object at a highest possibility. This is achieved either by automatically control the aimpoint of the camera system towards an estimated position of the user's mobile device or by manually control the camera view to scan the field of activity. Candidate objects are recognized in the camera view and they are highlighted in the camera view presented on the user's mobile device. The user selects one object or multiple objects among recognized candidate objects as the target object for automated and focused camera viewing. Initial target object position and features are obtained from the image of the target object. The user can further adjust the camera's zoom ratio on the mobile device to set a reference object presentation ratio for focused view. Otherwise, a default object presentation ratio or program is used as reference.

Exemplary embodiment of the camera's orientation position and motion include the camera system's pan and tile angles as well as their angular speeds and angular accelerations. Alternative embodiment of the camera's orientation position and motion are realized by a software program that allows the camera view delivered to the user by panning and tilting digitally within the full view of the camera without physically moving the camera.

The invention disclosed and claimed further comprises a method for controlling the orientation position and velocity of the camera system. The method first computes a target object's position in a field coordinate system. It then computes the motion of the target object based on its position measurements. It further computes the future position and motion of the target object. The method finally controls the aimpoint of the camera system at a velocity determined based on the computed target object's positions and motions such that the aimpoint of the camera system follows the target object closely at substantially the same velocity in the filed coordinate system.

In some embodiments of the present invention, the measurement of object's position is obtained using vision and/or WiFi based positioning methods and apparatus. In some other embodiments, the measurement of target object's position is obtained from equivalent positioning methods and apparatus using cellular network and/or navigation satellites.

In some embodiments of the present invention, the camera view is transferred to connected mobile devices, display devices for real time showing. In yet some embodiments of the present invention, the camera view video is recorded for playback reviewing and for sharing.

Illustrative embodiments of the present invention are directed to method and apparatus for automatic object-following camera view control. Exemplary embodiments of the invention comprises at least one camera system; at least one mobile device; a communication network including a WiFi network with at least one access point; and a computer based service control center. Embodiments of the present invention further comprise display devices and internet connected computers and data storage services. Additional features and advantages of the invention will be made apparent from the following detailed description of illustrative embodiments.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention discloses methods and apparatus for an automatic camera viewing system that provides high quality focused camera view over moving objects in sport, performance and entertainment activities. The invented system automatically recognizes candidate objects in an activity field and highlights them on camera view displayed on a user's mobile device. A user can specify a target object from the candidate objects for focused camera view following. After that, the invented system automatically controls the orientation of a camera system such that the aimpoint of the camera system follows the motion of the target object closely in substantially the same moving velocity. The system automatically adjusts the zoom of the camera system to achieve a specified relative sizing of the target object presented in captured camera view. The camera view stream can be transferred to connected mobile devices and display devices for real time viewing. It can also be recorded in videos for playback reviewing and for sharing.

Figure 1:
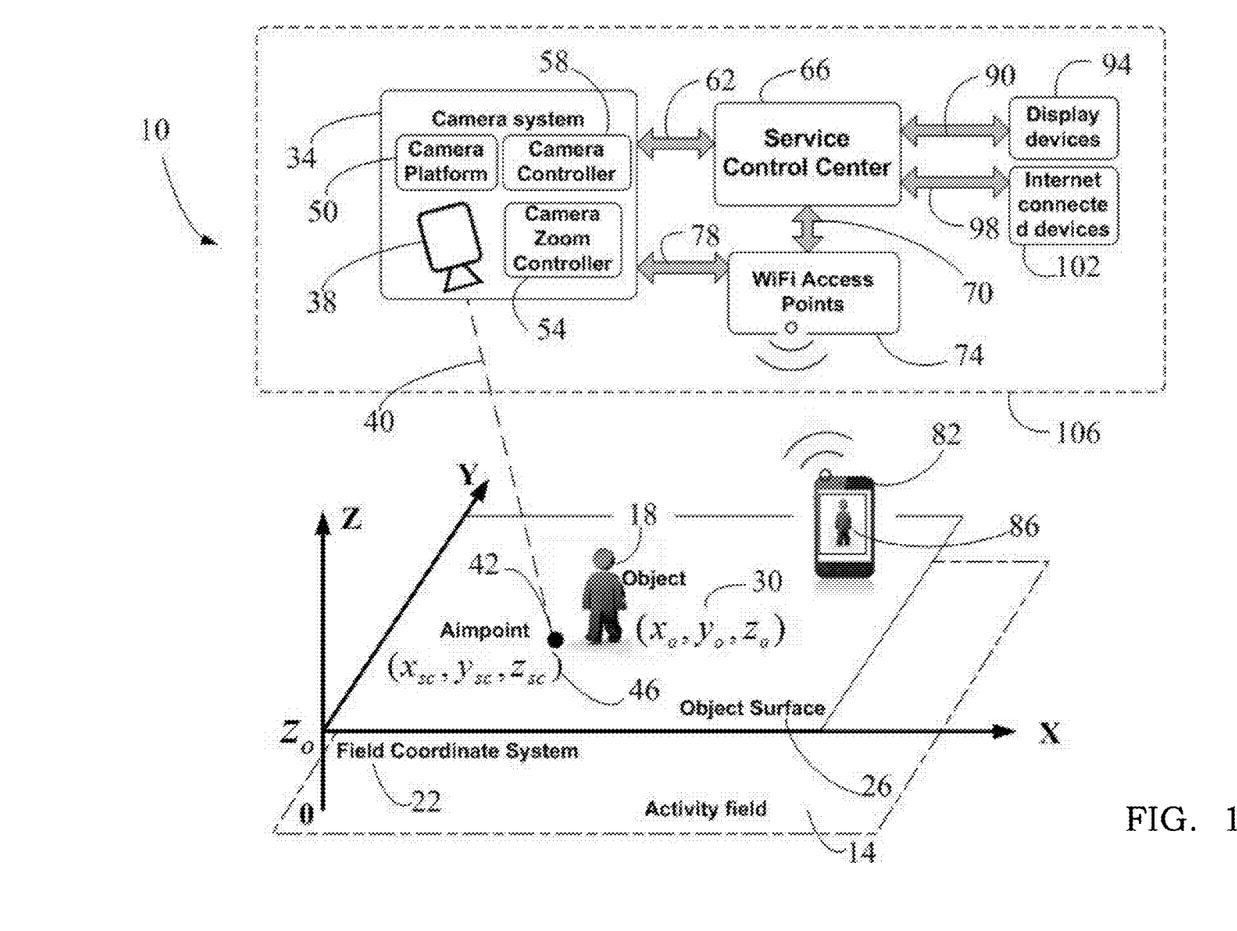
FIG. 1 is a schematic diagram of a service system that provides automatic and object-focused camera view control according to one or more embodiments.

With reference to FIG. 1, a service system that provides automatic and object-focused camera view control is illustrated in accordance with one or more embodiments and is generally referenced by numeral 10. The service system 10 comprises at least one camera system 34 for capturing view image stream, a service control center 66 for organizing service system and managing service control functions, at least one mobile device 82 for users to watch camera view and to specify target object, and a communication network including a WiFi network with at least one access point 74. The communication network further includes communication channels that use other types of wired and wireless communication methods and apparatus. These communication channels are denoted by numeral 62, 70, 78, 90 and 98. Primary embodiments of these communication channels are realized by the WiFi network and Ethernet cable connections. Alternative embodiments of such communication channels comprise wired communication networks (Internet, Intranet, telephone network, controller area network, Local Interconnect Network, etc.) and wireless networks (mobile network, cellular network, Bluetooth, etc.). Extensions of the service system also comprises connected display devices 94 for showing camera view as well as internet based devices and service 102 for storing and sharing recorded camera view videos.

The camera system 34, the service control center 66, and the communication network including a WiFi network with access point 74 together construct the core components of the system 10 on the service center side 106. Extended service center 106 may also comprises display devices 94 and internet connected devices/services 102. The mobile device 82 is the primary service client device for users to access the service functions provided by service center 106.

In an activity field 14, an object is illustrated by a person 18. Multiple objects 18 can be in the activity field 14. Among them, one object or multiple objects can be selected by a user as the target object for the camera system 34 to track in camera view. The captured view of the camera system 34 will follow and focus on an object 18 that is specified as the target object.

A field coordinate system (FCS) 22 is defined over the activity field 14. Exemplary embodiment of the FCS is a three dimension Cartesian coordinate system where three perpendicular planes, X-Y, X-Z and Y-Z, are defined in the activity space. The three coordinates of any location are the signed distances to each of the planes. In the FCS 22, an object surface 26 at the height of $z_o$ defines the base activity plane for tracking moving objects 18. The object surface 26 can be in any orientation angle with respect to the 3D planes of FCS 22. In the present embodiment, it is illustrated as a plane that is parallel to the X-Y plane. The position of an object 18 in the FCS 22 is defined by coordinates $(x_o, y_o, z_o)$ 30. In some other embodiment, the object surface 26 can be a vertical plane that is perpendicular to X-Y plane.

The position of the object 18 in FCS 22 is determined by an object tracking engine inside the service control center 66. The location of object 18 is computed based on measurement data related to its position in FCS 22 using either vision based positioning methods and apparatus or WiFi based positioning methods and apparatus or both. In a vision based positioning method, the position of an object in FCS 22 is determined based on the identified pixel position of the object in a camera view frame together with the spatial relationship between position in the camera frame's pixel coordinate and the position in FCS 22. In an exemplary embodiment of the WiFi based positioning method, the position of an object in FCS 22 is determined when the object is attached with a device that reads and reports the signal strength indicator (RSSI) of WiFi access points. Based on the obtained RSSI data, the position of the object can be determined from a pre-calibrated RSSI fingerprinting map over the activity field 14.

The position of the object in FCS 22 may be determined using a variety of methodologies. Non-limiting examples of suitable methodologies for vision based positioning method and apparatus and WiFi based positioning method and apparatus are described in U.S. patent application Ser. No. 14/177,772, and U.S. patent application Ser. No. 14/194,764, the disclosures of which are incorporated herein by reference.

The object tracking engine further computes the motion parameters of objects 18 in the activity field 14. Exemplary embodiments of the motion parameters comprise translational velocity and acceleration of the object 18 in the 3D space of FCS 22. Other embodiments of the motion parameters further comprise rotational velocity and acceleration of the object 18 around its motion center or center of gravity. Furthermore, the object tracking engine in the service control center 66 predicts the object's future position and future motion parameters.

A camera system 34 comprises a camera 38 for capturing view image stream and for transforming the camera view into digital or analog signals. The camera line-of-sight 40 is the extended centerline of the camera lens. Anything that first blocks the line-of-sight 40 is captured at the center point of the camera view image frame. The intersection point of the line-of-sight 40 and the object surface 26 defines the aimpoint 42 for the camera system 34. The aimpoint location 42 has a coordinates $(x_{sc}, y_{sc}, z_{sc})$ 46 in FCS 22, where $z_{sc} = z_o$ in the exemplary embodiment.

The camera system 34 comprises a camera platform 50 that controls the orientation of the camera. The camera platform 50 can actuate to place camera aimpoint 42 at desired position in FCS 22 and at reference aimpoint moving velocity. When the position and motion of an object 18 is known, the camera platform can follow commands to control the camera aimpoint 42 aiming at the position of the object 18 or at a position next to it while it controls the camera aimpoint in a motion substantially the same as the motion of the object 18 in FCS 22. As a result, the object is kept being captured in the camera view continuously and smoothly.

In some embodiments of the camera system 34, the camera platform 50 comprises a mechanical pan and tilt mechanism to physically control camera orientation to a pan angular position and a tilt angular position in order to place the camera aimpoint 42 at desired positions in FCS 22. The mechanical camera platform also measures the physical pan and tilt angles as well as their rotational speeds. In some other embodiments of the camera system 34, the camera platform 50 is a software program that extract output camera view frame from a larger size original camera view frame. The digital camera platform uses digital pan and tilt methods to move the output camera view frame within the original camera view frame in image pixel coordinate. The output camera view frame centers at a pixel point corresponding to a location in FCS 22 that is determined based on the spatial relationship between the camera view image's pixel position and the position in FCS 22. This location is now defined as the aimpoint 42 for a camera system 34 using digital camera platform. The digital camera platform can move the output camera view frame inside the original camera view frame at pan and tilt speeds to follow a desired aimpoint motion in FCS 22.

The camera system 34 comprises a camera zoom controller 54 that can change the camera zoom to adjust the area coverage size of the camera view with respect to the activity field 14. Changing the camera zoom also change the relative image size of an object 18 in the camera view. In some embodiments, the zoom controller 54 is a mechanical device that adjusts the optical zoom of the camera 38. In some other embodiments, the zoom controller 54 is software based digital zoom device that crop the original camera view down to a centered area with the same aspect ratio as the original camera view.

The camera system 34 also comprises camera controller 58. The camera controller is a computerized device for configuring camera system 34 and transferring camera view stream to connected devices. It also takes inputs from connected devices to change the states of the camera system 34 and to report the camera system parameters to connected devices. For example, when camera orientation and zoom control instructions are received, the camera controller 58 commands the camera platform 50 and the camera zoom controller 54 to place camera orientation towards target pan and tilt positions at desired pan and tilt speeds as well as to adjust the camera zoom to commanded zoom level.

A mobile device 82 is a computerized device that comprises memory, screen 86 and at least one processor. It is connected to the communication network. Exemplary embodiments of mobile devices are smartphone, tablet computer, laptop computer, etc. A user uses a mobile device 82 to access the automatic camera viewing service. The mobile device 82 communicates with the camera system 34 and the service control center 66 through a WiFi network 74. Other wireless communication channels may also be used. After receiving the camera view stream signal, the mobile device displays the camera view on its screen 86. The mobile device communicate data and commands with the camera system 34 including instructions that take user inputs to control the pan and tilt motions to change the camera orientation and instructions that take user inputs to change camera zoom and view resolution. The mobile device also communicates with the service control center 66 including object data, instructions that specify target object for camera view following, instructions that configure service system options, instructions that change service system operations, and instruction that reports RSSI of WiFi access points, etc.

In the camera view displayed on the screen 86 of the mobile device 82, a user selects one object or multiple objects among recognized candidate objects as the target object for automated focused view. Parameters of the target object are reported to the service control center 66 to identify and initialize the target object. The user can further adjust the camera's presentation orientation, resolution, camera orientation and zoom manually on the mobile device. A user can also control the camera view stream transfer routes to determine addition camera view display methods. A user can also setup the camera view stream recording option for camera view video reviewing, uploading and sharing methods.

The communication network in the service system 10 comprises a WiFi network 74 with at least one access point. The RSSI data of the access points can be evaluated by the mobile device and reported to the service control center 66. Based on the RSSI data, the service control center 66 can determine the location of the mobile device 82 based on the RSSI fingerprinting data over FCS 22. The communication network comprises communication channel 70 that connects service control center 66 to the WiFi network 74; the communication channel 78 that connects the camera system 34 to the WiFi network 74; and the communication channel 62 between the camera system 34 and the service control center 66. Such communication channels can be part of the wireless communication channels provided by the WiFi network 74. They can also be wired communication channels using Ethernet or other types of computer networking connections.

The communication network also provides connections between the service control center 66 and other display devices 94 through communication channel 90. Exemplary embodiment of the display devices is a stadium large screen and exemplary embodiments of the communication channel 90 can be intranet, WiFi, Ethernet, controller area network, or interconnect device network, etc. The communication network further provides connections between the service control center 66 and internet connected devices/service 102. Exemplary embodiments of the internet connected devices include remote computer device, cloud based data storage and sharing services, etc. The communication channel 98 is mainly the internet and other supporting communication connections.

The service control center 66 is a computer device that comprises memory and at least one processor. It is connected to the communication network. The service control center 66 is design to provide a bunch of system operation functions comprising camera system controls, object recognition and positioning, target object motion estimation, and other communication and control functions with the mobile device 82, the display devices 94 and the internet devices 102.

One function of the service control center 66 is to locate a mobile device based on its reported RSSI data. At each position in FCS 22, the mobile device 82 reports values of the RSSI for every access point in range. Based on the RSSI data, the position of the mobile device in FCS 22 can be determined. Exemplary embodiment of the WiFi positioning method uses a fingerprinting RSSI map defined for FCS 22 to interpolate the position of the mobile device. After locating the mobile device, the service control center 66 commands the camera system 34 to place its aimpoint 42 at the determined. The service control center 66 also determines a zoom level for the camera system 34 such that the camera view at the determined zoom level sufficiently covers an area of the activity field 14. The area is supposed to contain an object 18 holding the mobile device 82. In some cases that the RSSI data is not available or is not good enough for locating the mobile device, the service control center 66 controls the camera system 34 to a default orientation position and a default zoom level. A user can then control the camera orientation and zoom manually to scan the activity field 14 in order to find an expected target object in the camera view.

After receiving camera view stream, the service control center 66 processes the camera view frame and it recognizes objects 18 showing up in the image frame. The service control center 66 then adds highlighting effect to identified objects 18 in the camera view frame. The highlighted objects 18 are the candidate objects from which the user selects target object that will be followed and focused in the camera view. After a user specifies a target object from the candidate objects, the service control center 66 evaluates the position of the target object in FCS 22. The service control center 66 next commands the camera system 34 to place its aimpoint 42 at the target object's position. A default object presentation ratio is commanded by the service control center 66 such that the applied camera zoom achieves a predetermined size of the target object displayed with respect to the size of the camera view frame.

A user may further control the camera orientation and zoom manually from the mobile device to refine the presentation effect in the camera view. Based on the last inputs from the user, the service control center 66 computes the offset positioning parameters of the camera aimpoint 42 in relation to the position of the target object. The service control center 66 also determines the reference object presentation ratio based on the last user's input that results in camera's zoom adjustment. These offset parameters and object presentation ratio will be maintained in the future camera viewing control process until the task is finished or new user input is received. Besides the user specified object presentation effects, the service control center 66 can also apply an event based camera orientation and presentation programs to adapt the presentation of the target object in camera view based on the behavior of the target object or the presence of certain situations.

After target object specification is finished, the service control center 66 initializes its object tracking engine by taking the initial position of the target object and by learning the features of the target object for object recognition in future camera view frames. When new camera view frame comes, the service control center 66 recognizes the target object and computes its position in FCS 22 using vision based positioning methods or WiFi based positioning methods or both. Meanwhile, new features of the target object are learned by the object tracking engine to strengthen its object recognition robustness and capability. Based on the computed position of the target object, the object tracking engine is able to estimate the motion of the target object in FCS 22 including its moving velocity and acceleration. Exemplary embodiments of the motion estimation algorithm can be a Bayesian filter based Kalman filter algorithm or particle filter algorithm. Alternatively, an image pixel motion based Optical flow method can be used. The object tracking engine can further predicts future position and motion of the target object in FCS 22.

Based on the computed position and motion of the target object, desired position and motion of the camera aimpoint 42 are then determined by the service center system 66. The desired aimpoint position is located at or next to the position of the target object with consideration of the specified offset parameters. The desired aimpoint velocity is also determined to substantially track the motion of the target object in FCS 22. Next, the service control center 66 evaluates the position and motion errors between the present aimpoint states and its desired states to compute a reference aimpoint velocity. The service control center 66 translates the reference aimpoint velocity into corresponding desired camera platform's pan and tilt angular speeds, and then commands them to the camera system 34.

In some embodiments of the service control center 66, the position and motion of the target object are determined directly using the camera view frame coordinates instead of involving the FCS 22. The corresponding camera orientation control is thus realized using the camera platform to control camera pan and tilt angles as well as their angular motions according to the position and motion of the target object in the camera view image's frame coordinate system.

After a target object is specified, the service control center 66 continuously evaluates the size of the target object presented in the camera view frame and commands camera zoom change accordingly to achieve the reference object presentation ratio.

Based on user's configuration and control inputs from the mobile device 82, the service control center 66 also processes the camera view stream and sends the camera view data to allowed display devices or internet connected devices for real time viewing. The camera view stream can be recorded into video files. The recorded videos can be downloaded to connected devices or to the mobiles device 82 for playback reviewing. The video records can also be uploaded to internet based data storage and video sharing services.

Figure 2:
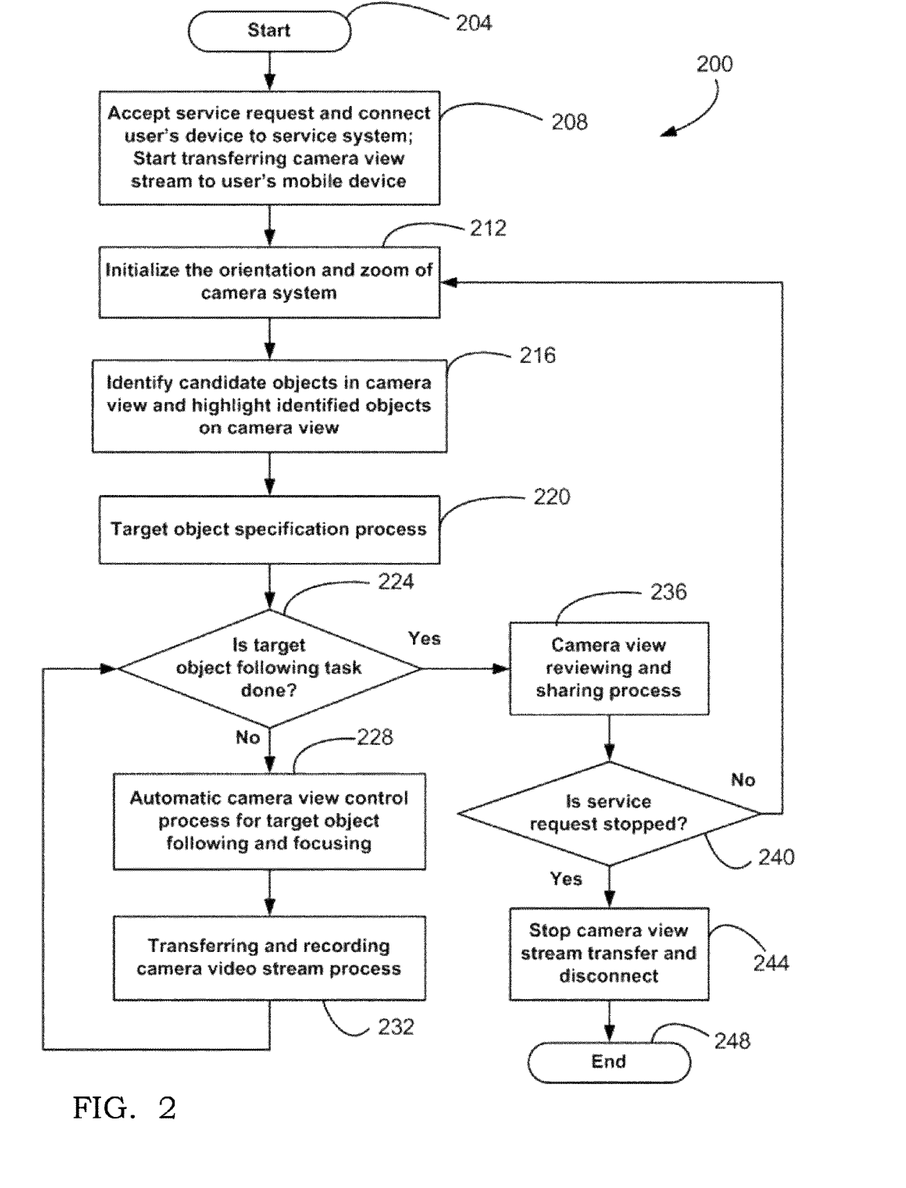
FIG. 2 is a flowchart illustrating an exemplary service process of the automatic and object-focused camera viewing control system according to one or more embodiments.

With reference to FIG. 2, a method for providing automatic and object-focused camera viewing service is illustrated according to one or more embodiments and is generally referenced by numeral 200. After starting at step 204, this method first accepts service request sent from a user's mobile device at step 208. After connecting the mobile device to the service system 106, the camera viewing method 200 starts transferring camera view stream from the camera system 34 to the user's mobile device 82. Next at step 212, the camera system is initialized for object-focused viewing controls, where the camera orientation and zoom are controlled such that the camera view covers an area in the activity field 14 containing a potential target object to be tracked in camera view. At step 216, candidate objects in the camera view frame are identified by the service control center 66 and they are highlighted in the camera view presented on user's mobile device. A user can next specifies the target object from the identified candidate objects at step 220. The target object is the object to be followed by the camera aimpoint 42 and to be focused by the camera view at a reference object presentation ratio. At step 224, the service method checks if the present camera view following task is cancelled or stopped by the user or by the service control center 66. If not, the method continues to step 228 where automatic camera view control process is executed to keep the target object tracked and focused in the camera view. Meanwhile at step 232, the camera view stream is transferred to the mobile device and other display devices for showing in real time. The camera view stream is also recorded into video records if the video recording option is configured from user's service request. After that, the method 200 goes back to step 224 and checks on the status of the present object following task. When task cancellation or stop command is received, the method next goes to step 236 to start camera video reviewing and sharing processes.

After that, the method 200 watches on if the camera viewing service is terminated by the user 18 or by the service control center 66 at step 240. If not, the method continues to step 212 to initiate the camera system and prepare for a new target-following and focused viewing process. Otherwise, the user's mobile device is disconnected from the service system 106 and the camera view stream transfer is stopped at step 244. The method ends at step 248.

Figure 3:
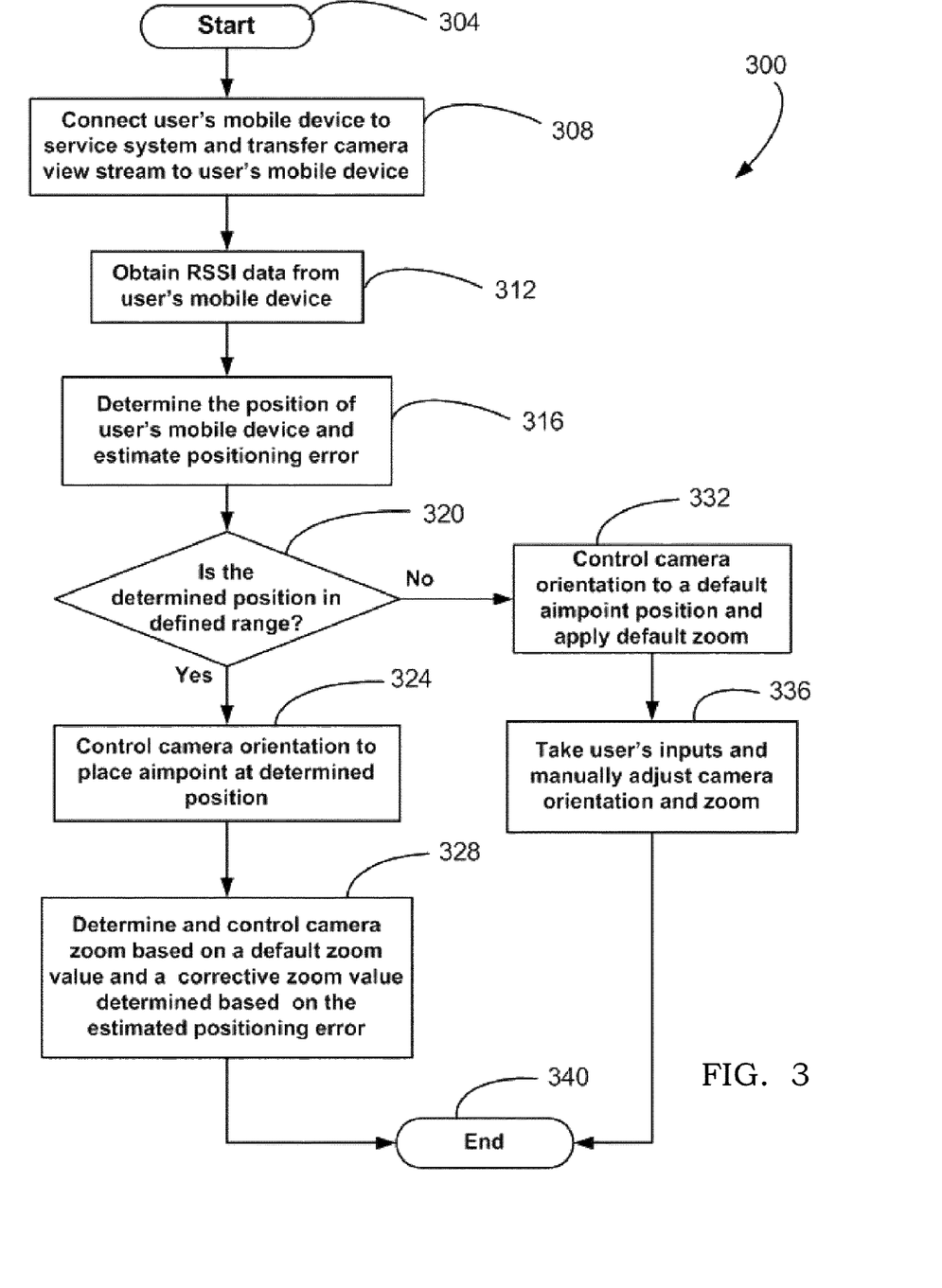
FIG. 3 is a flowchart illustrating a method for controlling the initial orientation and zoom of the camera system according to one or more embodiments.

With reference to FIG. 3, a method for controlling the initial orientation and zoom of the camera system 34 after a user is granted access to the service system 106 is illustrated according to one or more embodiments and is generally referenced by numeral 300. The method achieves the service function in step 212 in FIG. 2. After the process starts at 304, it connects user's mobile device to the service control center 66 and the camera system 34 through the WiFi network 74. After connected, camera view stream starts to transfer to the user's mobile device 82 and to display on the screen 86 at step 308. The mobile device 82 evaluates the RSSI of all access points 74 in range and reports RSSI data to the service control center 66 at step 312. After obtaining the RSSI data, the service control center 66 determines the location of the mobile device in FCS 22 by comparing the RSSI data with a RSSI fingerprinting data map pre-calibrated for FCS 22 at step 316. Due to WiFi signal variation and noise, a WiFi based positioning error $e_{wp}$ is also evaluated. The location of the user's mobile device shall be in an area of the activity field 14 that centers at the determined location with radius $e_{wp}$. This area is called error range. If the location of the mobile device is within the activity field 14, step 320 will continue to step 324, where the determined location of the mobile device in FCS 22 is mapped to corresponding pan angular position and tilt angular position of the camera platform 34. The service control center 66 next commands the orientation of the camera system 34 to place the aimpoint 42 at the determined location of the mobile device. Based on the evaluated positioning error $e_{wp}$, at step 328, a proper camera zoom level is determined by the service control center 66 such that the activity area covered by the camera view is larger than the error range. When the error range is small, a default zoom level is applied to assure sufficient basic area coverage in the camera view. After that, the method ends at step 340. However, if at step 320, it is found that the determined location of the mobile device is outside the activity field 14. The service control center 66 commands the camera system 34 to a default orientation position and it applies a default zoom level at step 332. Then it will wait for instructions from the user. Next at step 336, if an expected target object is not showing up in the camera view, a user can manually pan and tilt the camera orientation to scan the activity field 14 until the expected target object appears in the camera view. A user may also adjust camera zoom level manually to change the size of activity area covered by the camera view to help find the expected target object in the camera view easily. After that, the method ends at step 340.

Figure 4:
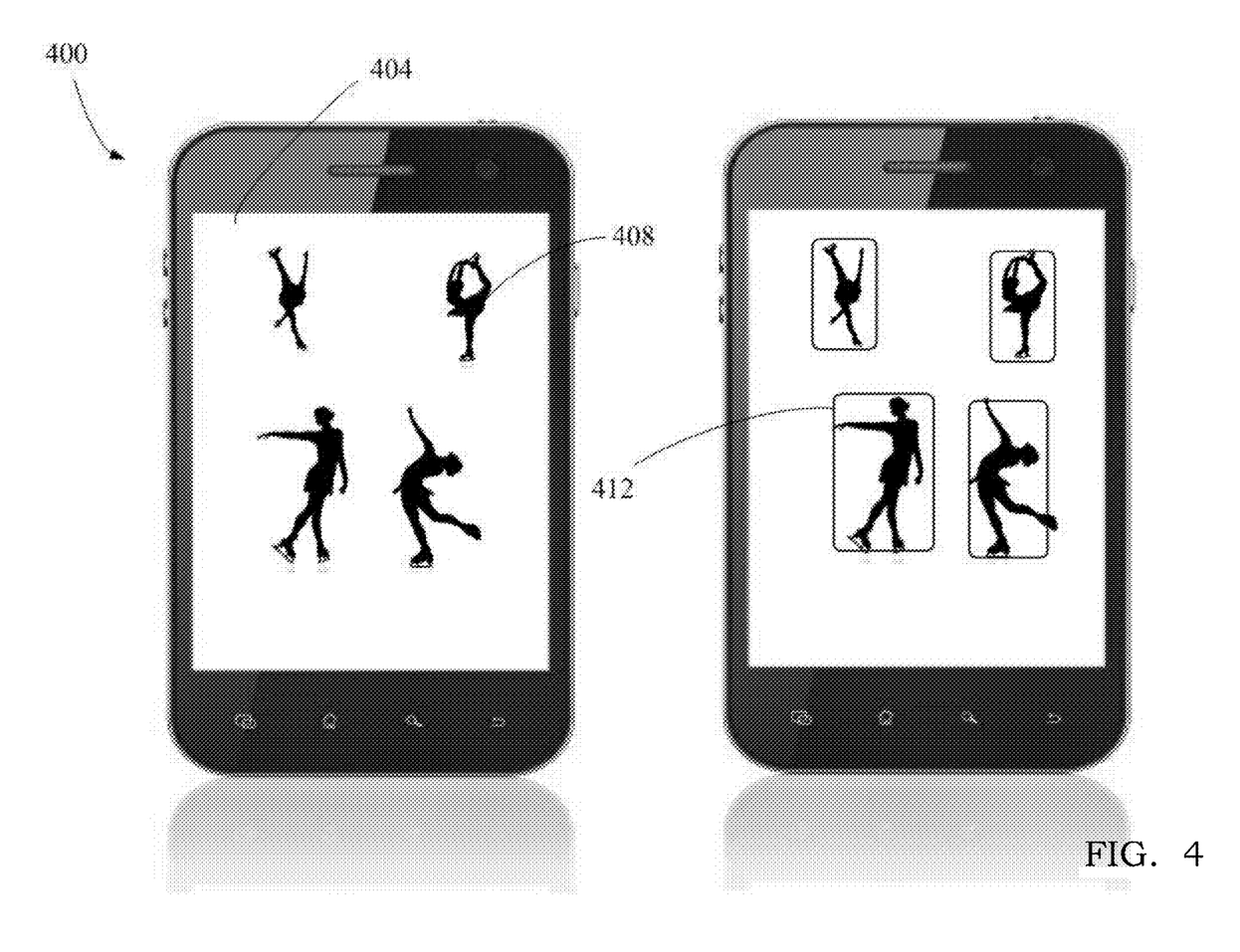
FIG. 4 is a schematic diagram of the camera view presented on user's mobile device and the highlighted identified candidate objects according to one or more embodiments.

With reference to FIG. 4, an embodiment of the camera view presented on user's mobile device and the highlighted identified candidate objects is illustrated and depicted by 400. Exemplary mobile device 82 and display screen 86 are used to help illustrating the camera view. After connected to the service system, the camera view 404 is presented on the user's mobile device as demonstrated by the left diagram of FIG. 4. Objects in the activity field 14 are illustrated by ice skating performers 408. Skaters 408 in an activity area covered by the camera view are captured in the camera view 404. The service control center 66 processes the camera view frame by frame and identifies candidate objects showing up in each camera view frame. After entering target selection mode, the identified candidate objects are highlighted on the screen 86 as demonstrated in the right diagram of FIG. 4, where enclosing squares 412 are used as exemplary embodiment of the highlighting method to mark individual candidate objects. Among these highlighted candidate objects, a user can select one or multiple of them on the screen to define a target object. The target object is the object on which the user intents to have the camera view continuously focused and tracked while the target object is moving in the activity field 14.

Figure 5:
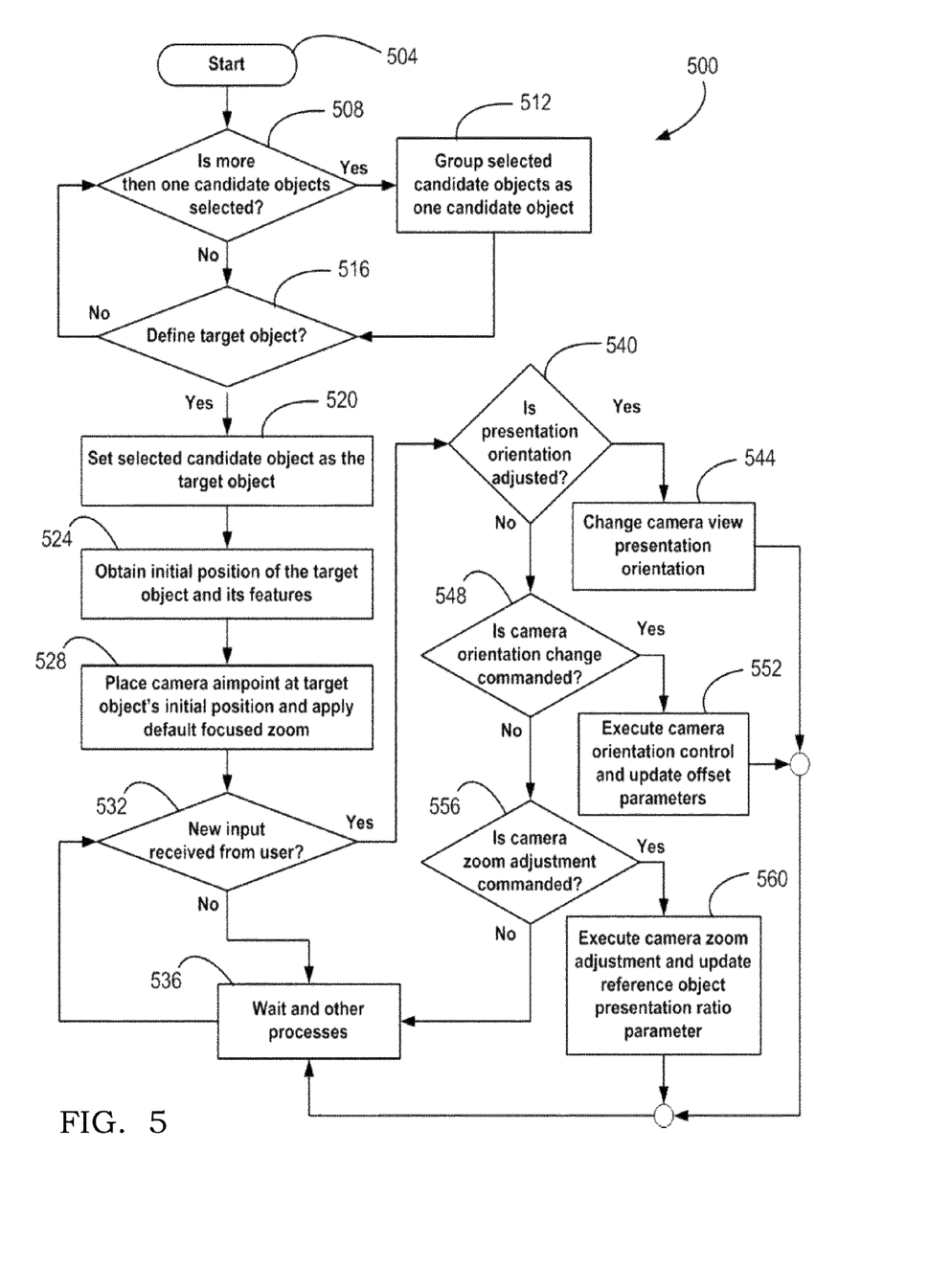
FIG. 5 is a flowchart illustrating a method for target object specification according to one or more embodiments.

With reference to FIG. 5, a method for target object specification is illustrated according to one or more embodiments and is generally referenced by numeral 500. After the process starts at step 504, it first checks on how many candidate objects are selected by the user at step 508. Selected candidate object will be highlighted in a different pattern than other candidate objects. Different line color and/or line weight are typically used for this purpose. If more than candidate objects are selected, the selected objects are then grouped together as one candidate object at step 512. Until the target object set mode is activated by the user at step 516, the method will finalize the selected candidate object as the target object. At step 524, the position of the selected candidate object is used as the initial position of the target object. If the target object contains a group of objects, a group-object position is then used as the grouped object's position. Exemplary embodiments of the group-object position are: geometric center position of all the included objects' positions; the leader object's position; a position that has the lowest object moving speed; the cluster center position of the included objects, etc. Meanwhile, features of the target object are learned from the image of the selected candidate object in the camera view. The object features are used to for object recognition in future camera view frames. Exemplary embodiments of object features comprise but not limited to: color, illumination, local binary pattern, texture, geometric shape, size, profile, image template, as well as their derived statistical data and mathematical object models.

At step 528, the service control center 66 translates the initial target object's position into camera orientation positions and the camera system 34 is commanded to move its platform's pan and tilt angles to corresponding angular positions such that the aimpoint 42 of the camera system is shooting at the position of the target object. Meanwhile, the camera zoom is adjusted to a level that has been predefined to realize a default object presentation ratio or default activity area coverage. Further zoom adjustment may be carried out after evaluating the image size of the target object against the overall size of the camera view frame. After that, the method starts waiting for user's instruction inputs at step 532. While waiting, other system and object preparation operations may be executed at step 536. Once a user input is received from the user's mobile device 82, the method first checks if this is an instruction to adjust presentation orientation at step 540. If true, the system goes to step 544 and it adjusts the orientation of the camera view following the instruction to one of the following results: landscape, portrait, or in a certain angle to landscape or portrait. Otherwise, the method checks if the received user input is a command to change camera orientation at step 548. If true, the camera system 34 executes the command received from the mobile device to change the pan and/or tilt angular position accordingly at step 552. After orientation change is done, the camera aimpoint offset parameters are updated based on the distance between the position of the target object and the position that corresponds to the present camera view center in FCS 22. Otherwise, the method next checks on if the received user input is a command to adjust camera zoom at step 556. If true, the camera system 34 will zoom-in or zoom-out accordingly. Once done, the reference object presentation ratio is updated based on the newly evaluated ratio between the size of the target object and the size of the camera view frame at step 560. After respond to the user input in all these steps, the method next goes to step 536 and wait for future user inputs.

Figure 6:
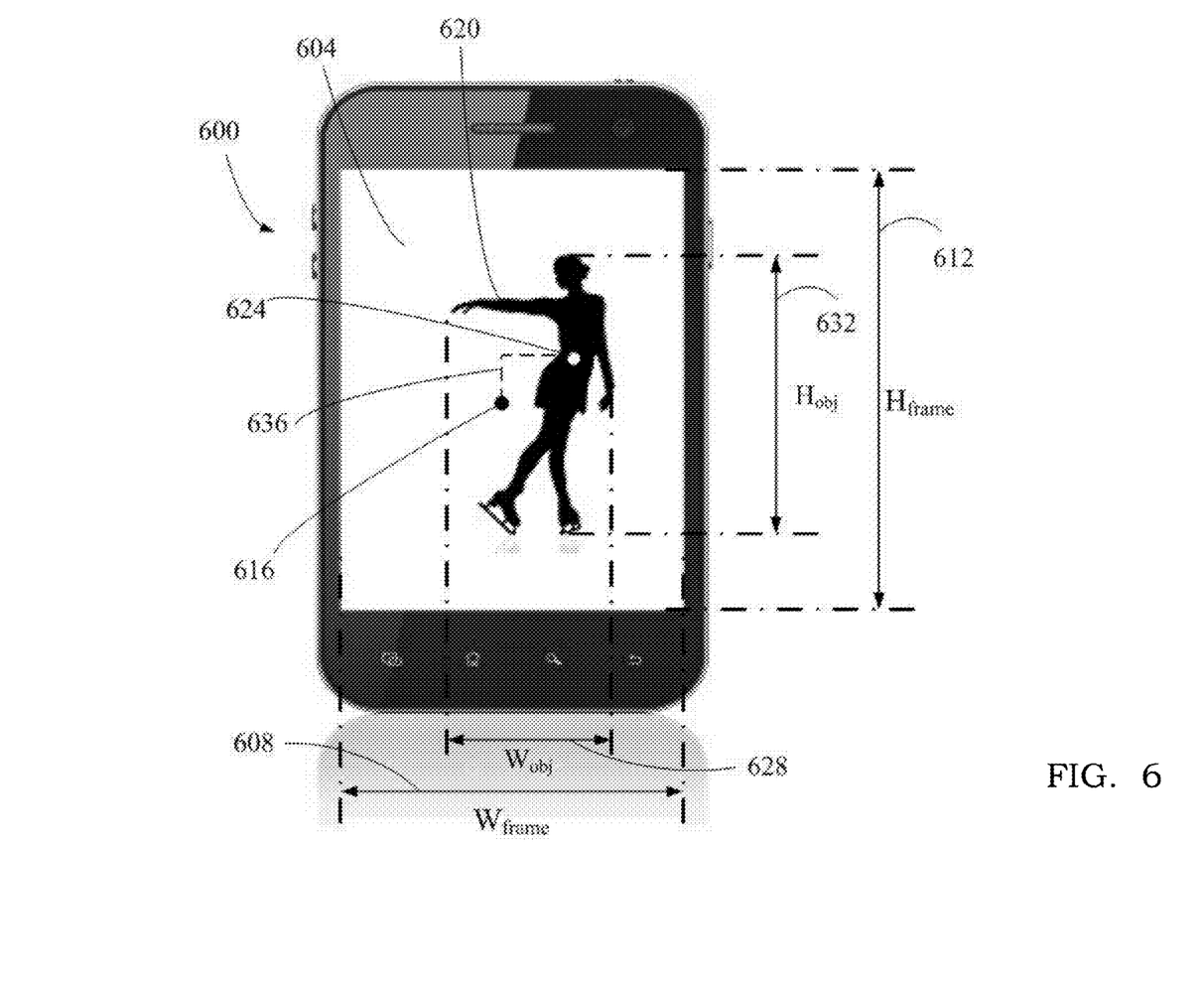
FIG. 6 is an illustration of a camera view for configuring object presentation parameters according to one or more embodiments.
Figure 7:
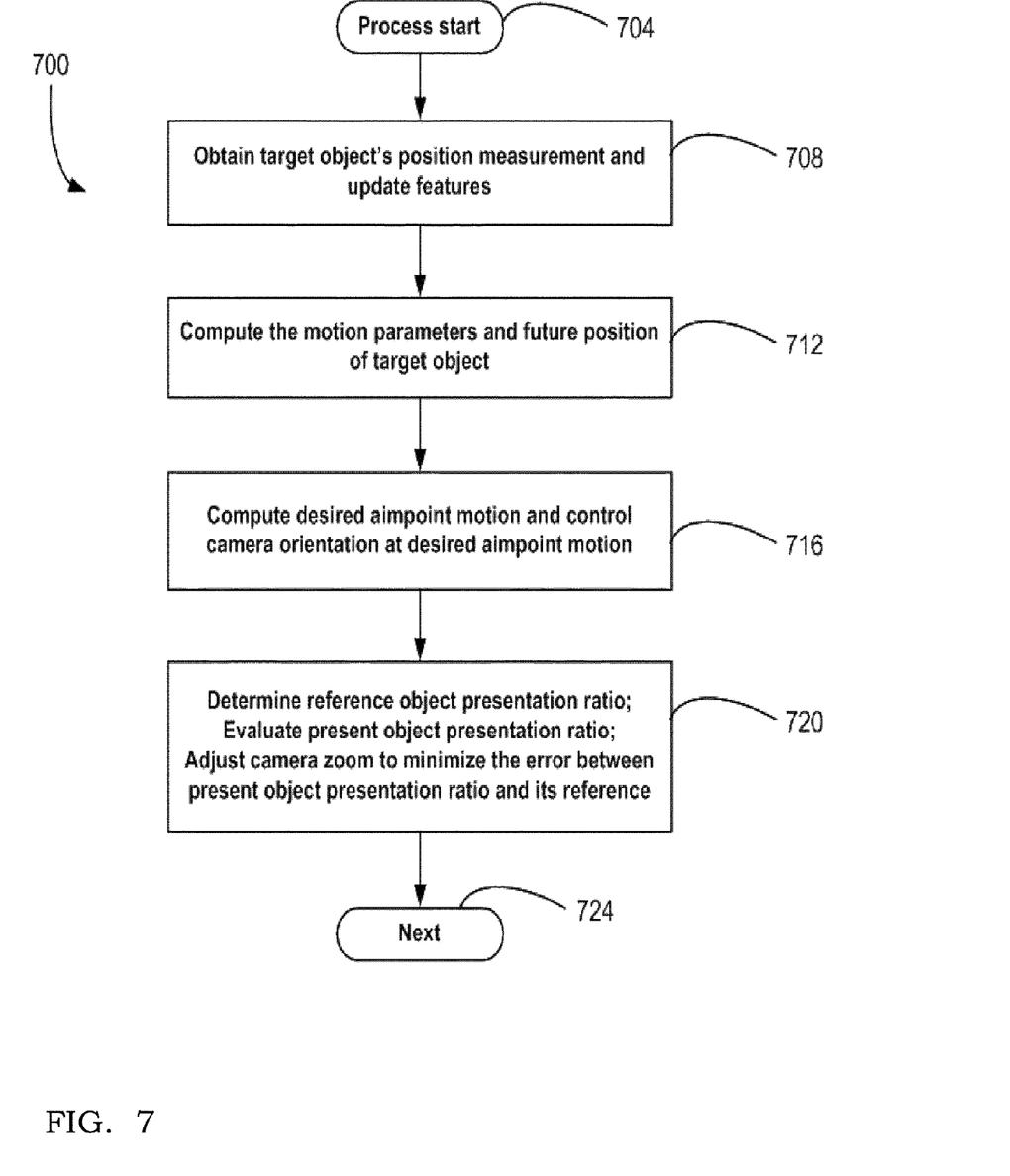
FIG. 7 is a flowchart illustrating a method for automatically controlling camera view to achieve target object following and focusing according to one or more embodiments.

With reference to FIG. 6, a camera view on user's mobile device for configuring object presentation parameters is illustrated in accordance with one or more embodiments and is generally referenced by numeral 600. Exemplary mobile device 82 and display screen 86 are used to help illustrating the camera view. The displayed camera view frame 604 has a width of $W_{frame}$ 608 and a height of $H_{frame}$ 612. The center of the camera view frame is illustrated by a dot 616. After the target object 620 is selected, the camera system 34 will control its orientation and zoom to present focused view over the target object as shown in FIG. 7. Now on the camera view 604 presented on the screen 86, the user can further adjust the presentation effects for the target object 620. By commanding the camera zoom change, the relative size of the target object 620 presented in the camera view changes accordingly. The more the zoom-in, the larger the size of the target object 620 displayed. The evaluated width of the target object is $W_{obj}$ 628 and the height of it is $H_{obj}$ 632. An exemplary embodiment of the object presentation ratio is defined by a vector of the width ratio and the height ratio as $$\left(\frac{W_{obj}}{W_{frame}}, \frac{H_{obj}}{H_{frame}}\right).$$

Given a reference object presentation ratio defined in this way, the object presentation control aims to adjust the camera zoom either to minimize the average value of the width ratio error and the height ratio error or to minimize one of them. An alternative exemplary embodiment of the object presentation ratio is defined by ratio of object area to frame area as $$\frac{W_{obj} * H_{obj}}{W_{frame} * H_{frame}}.$$

In this case, the object presentation control aims to adjust camera zoom level such that the error between the ratio of areas and the reference ratio value is minimized.

By manually command the camera's pan and tilt orientation changes, the center point 616 of the camera view frame moves relatively to the target object 620 as the aimpoint 42 of the camera system moves in the FCS 22. The reference position of the target object 620 in the camera view frame 604 is depicted by dot 624. An exemplary embodiment of the reference position 624 is defined by the geometric image center or the body center of the target object. When the distance 636 between the camera frame center 616 and the center of the target object 624 is larger than a threshold value, the distance 636 in width and height of the camera view frame coordinate define the object presentation's width offset and height offset parameters. These offset parameters are useful when a user want to present the target object in the camera view in a biased position. Such offset width and height parameters will be used to determine the target aimpoint position in relative to the position of the target object in FCS 22 in the automatic camera view control process. The spatial relationship between the camera view frame coordinate and the FCS 22 is used in this determination.

With reference to FIG. 7, a method for automatically controlling camera to achieve target object following and focused viewing is illustrated according to one or more embodiments and is generally referenced by numeral 700. After the process starts at step 704, when new camera view frame comes, the service control center 66 recognizes the target object and its object tracking engine computes the position of the target object in FCS 22 using vision based positioning methods at step 708. The WiFi based positioning methods can also be used to assist the positioning process. Meanwhile, new features of the target object are learned from the most recent camera view to strengthen future object recognition robustness and accuracy. Based on the computed position of the target object, at step 712, the object tracking engine is able to estimate the motion of the target object including its moving velocity and acceleration in 3D space of FCS 22. Exemplary embodiments of the motion estimation algorithm can be a Bayesian filter algorithm or an optical flow method. The object tracking engine can further predicts future position and motion of the target object in FCS 22.

Based on the computed position and motion of the target object, desired position and motion of the camera aimpoint 42 are then determined at step 716 by the service center system 66. The desired aimpoint position is located at or near the position of the target object with consideration of the object presentation offset parameters. The desired aimpoint motion is determined to substantially follow the same motion of the target object in FCS 22. Next, the service control center 66 evaluates the position error and motion error between the present aimpoint states to its desired position and motion states to compute a reference aimpoint velocity. The service control center 66 then translates the reference aimpoint velocity into corresponding camera platform's pan and tilt angular speeds, and then commands them to the camera system 34. The reference aimpoint velocity in FCS 22 may be determined using a variety of methodologies. Non-limiting examples of suitable methodology for aimpoint motion control is described in U.S. patent application Ser. No. 14/177,772, the disclosures of which are incorporated herein by reference.

The position of the target object in FCS 22 is determined based on the identified position of the target object in the image frame of the camera views. The spatial relationship between the positions in camera view frame coordinate (pixel coordinate) and the FCS 22 is used to map the identified pixel position of the target object to its position in FCS 22. In some embodiments of the service system 106, more than one camera systems are involved in the vision based object positioning process. While the primary camera system captures the target object and feeds the camera view stream to the user's mobile device for viewing, other camera systems capture the target object and feed the camera view stream to the service control center 66 to support target object recognition and positioning. The role of camera systems in the object tracking process can switch among them based on the position of the target object in FCS 22.

In some other embodiments of the service control center 66, the position and motion of the target object are evaluated in camera view frame's pixel coordinate directly instead of mapping it back to the FCS 22. The corresponding camera orientation control is then realized using spatial relationship between the camera view coordinate and the camera platform coordinate. A pixel position in the camera view frame is mapped to a corresponding camera platform's pan and tilt angular position directly.

At step 720, object presentation ratio control is carried out. The service control center 66 first determines the reference object presentation ratio. The object presentation ratio evaluated at the latest user's zoom control input is used as the reference object presentation ratio. A default object presentation ratio is used if no user's zoom adjustment input is ever received in object specification phase. When an object presentation ratio template is configured, the reference presentation ratio is then determined from a preprogrammed presentation ratio template. Such object presentation ratio templates are event based and a certain value of object presentation ratio is used when detecting the occurrence of an event or the step of a procedure. Exemplary embodiments of such events comprise: a rotating behavior above/below a certain speed threshold; a moving behavior above/below a certain speed threshold; a certain body behavior of the performer; a certain pattern of group objects; a certain procedure of the performance; etc. The service control center 66 next evaluates the present object presentation ratio based on the identified size of the target object in the camera view frame. The error between the present object presentation ratio and its reference value is then interpreted into camera zoom control command that results in zoom-in and zoom-out actions towards minimizing the presentation ratio error. After that, the process ends at step 724 and it continues to other operations.

Figure 8:
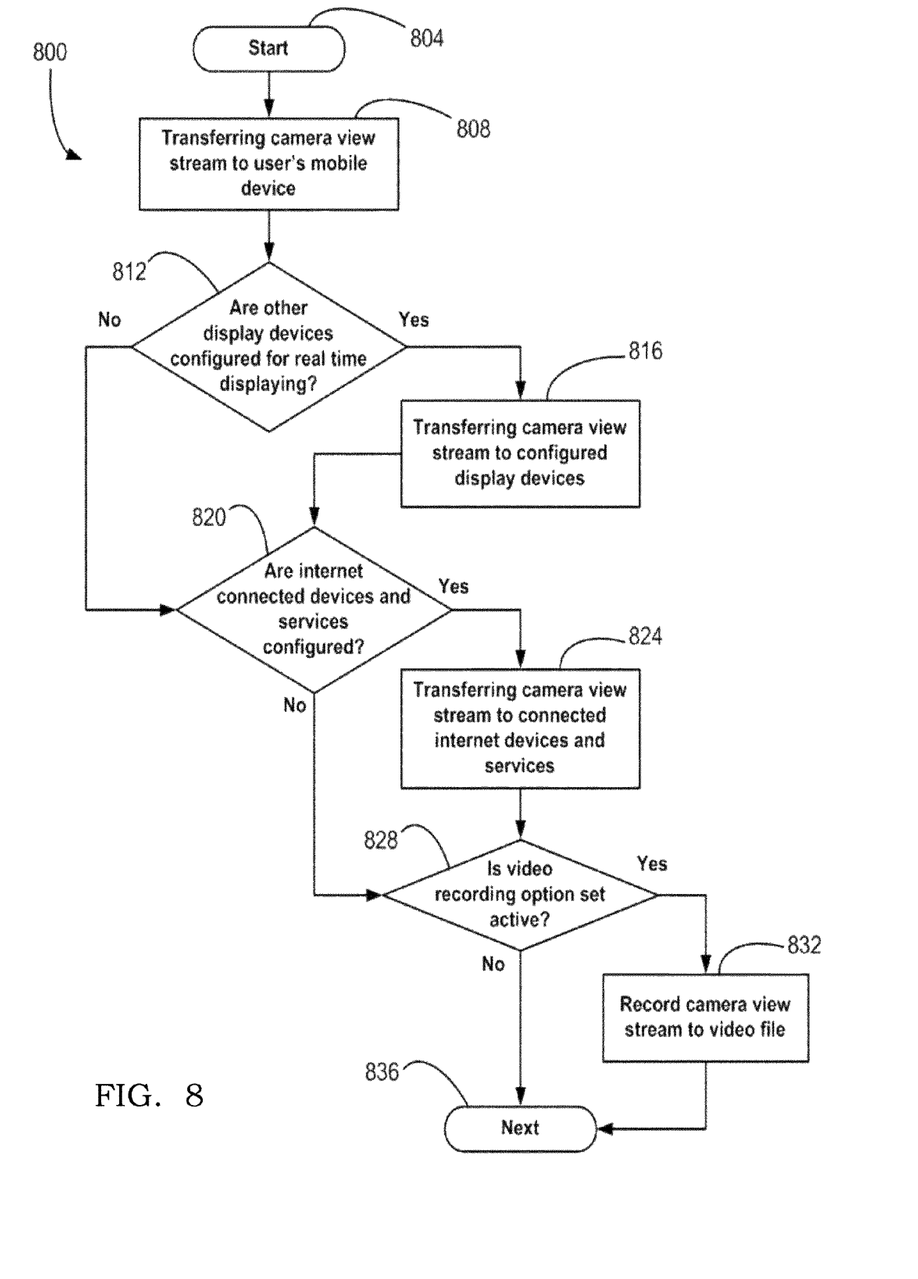
FIG. 8 is a flowchart illustrating a method for camera view stream transfer according to one or more embodiments.

With reference to FIG. 8, a method for camera view stream transfer is illustrated according to one or more embodiments and is generally referenced by numeral 800. Based on user's configuration and control inputs from the mobile device 82, the service control center 66 processes the camera view stream and directs the camera view stream to allowed display devices or internet connected devices for real time displaying. After starting at step 804, the camera view stream is first transferred to the user's mobile device 82 at step 808. Next, the system configuration is checked to see if other display devices are activated for real time camera view displaying at step 812. If found, camera view stream is directed to these display devices at step 816. After that or if no other display device found, the system configuration is checked to see if internet connected devices and services are enabled for real time camera streaming at step 820. If found, the camera view stream is transmitted to the IP addresses of these devices at step 824. The camera view stream video can also be recorded at step 832 if video recording option is activated at step 828. The method ends at step 836 and it continues to other operations. The video recording process can be executed in the service control center 66, in the mobile device 82 or in other connected devices and services 94 and 102.

Figure 9:
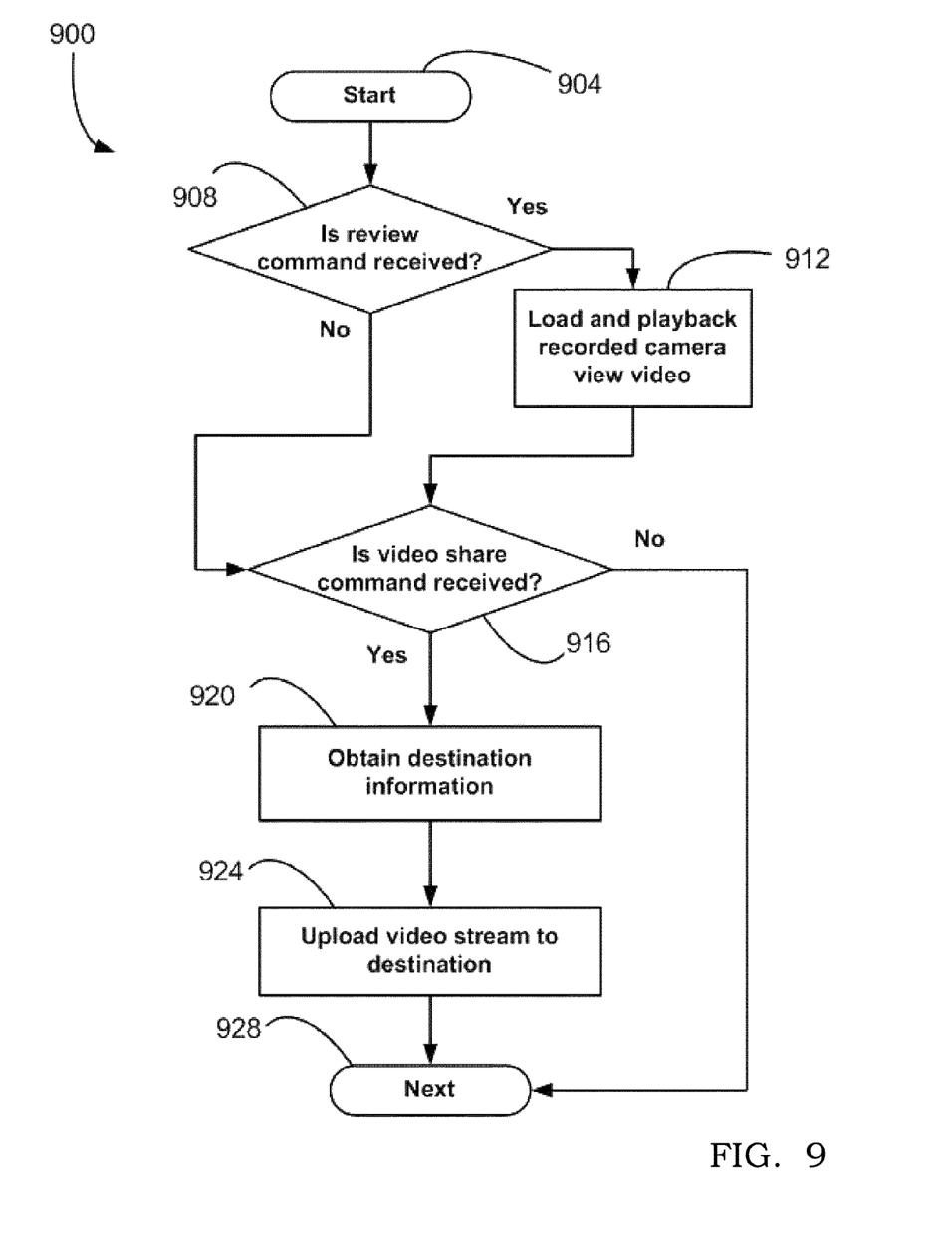
FIG. 9 is a flowchart illustrating a method for camera video reviewing and sharing according to one or more embodiments.

With reference to FIG. 9, a method for camera video reviewing and sharing is illustrated according to one or more embodiments and is generally referenced by numeral 900. The recorded camera view videos can be loaded to connected devices or to the mobiles device 82 for playback reviewing. They can also be uploaded to internet based data storage and video sharing services. Starting at step 904, the user's input is checked to see if video record review command is received at step 908. When received at step 912, the latest or a history record is found according to the user's selection, and this video record is loaded to a video play device or application to playback. At the next step 916, video-share command is monitored. If received, the video-share destination is obtained from user's input or from system configuration at step 920. The user selected video record is then uploaded to the destination site through the communication network at step 924. The method ends at step 928.

As demonstrated by the embodiments described above, the methods and apparatus of the present invention provide advantages over the prior art by integrating camera systems and mobile application devices through control and communication methods and apparatus. The resulted service system is able to provide applications enabling on-site target object specification and object focused camera view tracking High quality automatic object tracking in camera view can be achieve in a smooth and continuous manner while a target object is performing in an activity field.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A method for providing automatic and focused camera view following objects in motion comprising:
   initiating the orientation and zoom of a camera system and transferring the camera view stream to a user's mobile device;
   highlighting identified candidate objects in said camera view presented on said user's mobile device;
   preparing object tracking engine by obtaining a target object's initial position and features after a user specifies said target object on said user's mobile device;
   determining the position of said target object and computing the motion parameters of said target object;
   controlling the orientation motion of said camera system based on the position and motion of said target object such that the aimpoint of said camera system follows said target object closely and at substantially the same velocity as that of said target object;
   controlling the zoom of said camera system to achieve a reference object presentation ratio;
   transferring camera view stream to connected devices and recording camera view video.

2. The method of claim 1, wherein said initiating the orientation and zoom of a camera system comprises controlling the pan and tilt positions of said camera system to place the aimpoint position at a determined position of a user's mobile device; and adjusting said zoom of said camera system such that the view of said camera system sufficiently covers an area containing a potential target object.

3. The method of claim 1, wherein said initiating the orientation and zoom of a camera system comprises controlling the pan and tilt positions and zoom of said camera system manually from said user's mobile device.

4. The method of claim 1, wherein said candidate objects are identified from the same camera view frame presented on said user's mobile device.

5. The method of claim 1, wherein said candidate objects are identified and located in camera view from a second camera system, and the candidate objects are highlighted in said camera view presented on said user's mobile device at view frame positions that correspond to their identified locations in view frame from said second camera system.

6. The method of claim 1, wherein the specification of said target object comprises: selecting one or multiple candidate objects as the target object on said user's mobile device; and at least one of the following steps:
   adjusting the zoom of said camera system manually from said user's mobile device to set the reference object presentation ratio;
   applying a predefined object presentation ratio;
   applying an object presentation ratio program;
   adjusting the aimpoint position of said camera system relatively to the position of the target object to set the object presentation offset parameters;
   adjusting the camera view orientation and resolution from said user's mobile device.

7. The method of claim 1, wherein the position and motion of said target object are determined in a locally defined coordinate system using at least one of the following positioning method:
   a vision based positioning method;
   a WiFi based positioning method;
   a cellular network based positioning method;
   a navigation satellite based positioning method.

8. The method of claim 1, wherein the orientation control of said camera system comprises:
   computing a reference aimpoint velocity for said camera system based on the position and motion of said target object;
   translating said reference aimpoint velocity into desired pan speed and desired tilt speed of said camera system;
   controlling the pan motion of said camera system at said desired pan speed; and
   controlling the tilt motion of said camera system at said desired tilt speed.

9. The method of claim 1, wherein the zoom control of said camera system comprises:
   determining a reference object presentation ratio based on at least one of the sources including: the last zoom adjustment made from said user's mobile device; an application default value; an event based object presentation ratio program;
   computing the present object presentation ratio in said camera view presented on said user's mobile device;
   adjusting the zoom of said camera system to minimize the error between said present object presentation ratio and said reference object presentation ratio.

10. The method of claim 1, wherein said transferring camera view stream comprises at least one of the following:
   transferring camera view stream to said user's mobile devices through WiFi network;
   transferring camera view stream to display devices through communication network;

transferring camera view stream to a remote internet connected computer device.

11. The method of claim 1, wherein said camera view stream video recording comprises at least one of the following steps:
   playing recorded camera view video on said user's mobile device;
   transmitting video stream to a remote internet connected computer device;
   uploading video file to a data storage service connected from internet.

12. A system for providing automatic object tracking view presentation inside a panorama view for crowd service comprising:
   at least one camera system;
   at least one mobile device;
   a communication network including a WiFi network with at least one access point; and
   a service control center further comprising:
   memory, configure to store a program of instructions and data;
   at least one processor operably coupled to said memory and connected to said at least one camera system and to said at least one mobile device via said communication network, the processor is configured to execute said program of instructions, wherein said program of instructions are executed, carries out the steps of:
   initiating the orientation and zoom of a camera system and transferring the camera view stream to a user's mobile device;
   highlighting identified candidate objects in said camera view presented on said user's mobile device;
   preparing object tracking engine by obtaining a target object's initial position and features after a user specifies said target object on said user's mobile device;
   determining the position of said target object and computing the motion parameters of said target object;
   controlling the orientation motion of said camera system based on the position and motion of said target object such that the aimpoint of said camera system follows said target object closely and at substantially the same velocity as that of said target object;
   controlling the zoom of said camera system to achieve a reference object presentation ratio;
   transferring camera view stream to connected devices and recording camera view video.

13. The system of claim 12, wherein said camera system comprising:
   a camera for view capturing;
   a computerized device for transferring camera view to connected devices, and for communicating camera parameters and commands with connected devices;
   a camera orientation platform comprising pan and tilt mechanism, and pan and tilt position sensing mechanism;
   a camera zoom adjustment and sensing mechanism;
   a computerized device for controlling camera orientation position and velocity, and for adjusting camera zoom.

14. The camera system of claim 13, wherein said pan and tilt mechanism is at least one of the following devices:
   a mechanical pan and tilt device with mechanical position sensing device;
   a digital pan and tilt method with software based position sensing method.

15. The camera system of claim 13, wherein said zoom adjustment and sensing mechanism is at least one of the following devices:
   a mechanical zoom device that adjusts optical camera zoom;
   a digital zoom method by cropping the original camera view down to a centered area with the same aspect ratio as the original camera view.

16. The system of claim 12, wherein said mobile device comprising:
   memory;
   screen;
   at least one processor operably coupled to said memory and connected to said communication network, the processor is configured to execute a program of instructions, wherein said program of instructions comprising:
   at least one instruction to take user's input that results in orientation motion of said camera system including pan motion and tilt motion;
   at least one instruction to take user's input that results in zoom adjustment of said camera system;
   at least one instruction to report RSSI of WiFi access points to said service control center;
   at least one computer program product that, when executed, causes actions of said mobile device comprising:
   display said camera view stream on said screen;
   communicate data and commands with said camera system and said service control center;
   specify target object from highlighted candidate objects;
   save and playback camera view video record; and
   sharing data with internet connected devices.

17. The system of claim 12, wherein said service control center further comprising:
   at least one processor operably connected to said at least one camera system, the processor is configured to execute a program of instructions, wherein said program of instructions comprising:
   at least one instruction to command orientation motion of said camera system including pan motion and tilt motion;
   at least one instruction to command zoom adjustment of said camera system;
   at least one instruction to obtain camera view stream;
   at least one computer program product that, when executed, causes actions of said service control center comprising:
   determine the position of said mobile device based on received RSSI of WiFi access points from said mobile device;
   identify candidate objects in camera view frame and highlight candidate objects on camera view presented on said mobile device;
   recognize target object in camera view frame and compute target object's position and motion;
   compute desired aimpoint motion of said camera system and interpret said desired aimpoint motion into desired pan and tilt motion for said camera system;
   determine reference object presentation ratio and generate zoom commands for said camera system towards realizing said reference object presentation ratio.

18. The service control center of claim 12, further comprises an object tracking engine, wherein said object tracking engine
   compute target object's position and motion based on measured data related to the position and motion of said target object; and
   predict future position and motion of said target object.

19. The object tracking engine of claim 18, wherein obtaining said measured data related to position and motion of said target object comprises utilizing at least one of:
- camera vision based positioning apparatus;
- WiFi based positioning apparatus;
- cellular network based positioning apparatus;
- navigation satellite based positioning apparatus.

20. The system of claim 12, wherein said transferring camera view stream to connected devices and recording camera view video comprise at least one of the following:
- transferring camera view stream to said user's mobile devices through WiFi network;
- transferring camera view stream to display devices through communication network;
- transferring camera view stream to a remote internet connected computer device;
- playing recorded camera view video on said user's mobile device;
- transmitting video stream to a remote internet connected computer device;
- uploading video file to a data storage service connected from internet.

* * * * *